(12) United States Patent
Miyashita et al.

(10) Patent No.: US 9,601,956 B2
(45) Date of Patent: Mar. 21, 2017

(54) THREE-PHASE PERMANENT MAGNET TYPE MOTOR

(71) Applicant: SANYO DENKI CO., LTD., Tokyo (JP)

(72) Inventors: Toshihito Miyashita, Tokyo (JP); Masahiro Yamaguchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 644 days.

(21) Appl. No.: 14/041,199

(22) Filed: Sep. 30, 2013

(65) Prior Publication Data
US 2014/0091656 A1    Apr. 3, 2014

(30) Foreign Application Priority Data

Oct. 1, 2012 (JP) .................................. 2012-219464

(51) Int. Cl.
*H02K 3/28* (2006.01)
*H02K 3/52* (2006.01)
*H02K 3/00* (2006.01)

(52) U.S. Cl.
CPC ................ *H02K 3/00* (2013.01); *H02K 3/28* (2013.01); *H02K 3/522* (2013.01); *H02K 2203/03* (2013.01)

(58) Field of Classification Search
CPC .. H02K 5/22; H02K 5/225; H02K 3/52–3/528

(Continued)

(56) References Cited

U.S. PATENT DOCUMENTS 4,115,915 A * 9/1978 Godfrey ................... H02K 3/12
                                                                    29/596
7,408,281 B2 * 8/2008 Kinashi ................. H02K 21/16
                                                                    310/180

(Continued)

FOREIGN PATENT DOCUMENTS

CN              1728507 A        2/2006
JP      EP 1111757 A2 *  6/2001    ............. H02K 3/522

(Continued)

OTHER PUBLICATIONS

Japanese Office Action of foreign counterpart application 2012-219464 dated Jan. 26, 2016.

(Continued)

*Primary Examiner* — Thomas Truong
(74) *Attorney, Agent, or Firm* — Polsinelli PC

(57) ABSTRACT

A three-phase permanent magnet type motor has a stator in which a plurality of windings wound in a same direction are disposed, and the number of slots is 12n; a rotor in which the number of poles of the permanent magnet is 10n or 14n; and multilayer wiring boards for performing the connection so as to be 2m parallel. The three-phase permanent magnet type motor has a circuit configuration in which, among U-phase, V-phase, and W-phase, adjacent in-phase windings are connected in parallel and are connected in series with a like-pole winding of a symmetrical in-phase second winding group facing at 6-slot pitch angle, when a center of a first winding group of the adjacent in-phase windings is set as a reference axis, and in-phase transition wiring patterns are disposed on the same layer of the multilayer wiring boards in a line symmetrical manner.

7 Claims, 7 Drawing Sheets

(58) Field of Classification Search
USPC .......................................................... 310/71
IPC ................................................ H02K 3/52,5/02
See application file for complete search history.

(56) References Cited

U.S. PATENT DOCUMENTS

| | | |
|---|---|---|
| 8,179,011 B2 | 5/2012 | Takemoto et al. |
| 8,264,113 B2 | 9/2012 | Takemoto et al. |
| 2006/0022544 A1 | 2/2006 | Kinashi |
| 2009/0051234 A1 | 2/2009 | Yamane et al. |
| 2010/0148612 A1 | 6/2010 | Takemoto et al. |
| 2012/0175987 A1 | 7/2012 | Takemoto et al. |

FOREIGN PATENT DOCUMENTS

| | | |
|---|---|---|
| JP | 2006050690 A | 2/2006 |
| JP | 2010193675 A | 9/2010 |
| JP | 201025253 A | 11/2010 |
| JP | 2010252530 A | 11/2010 |
| JP | 4670868 B2 | 4/2011 |
| JP | H5308742 A | 10/2011 |

OTHER PUBLICATIONS

Office Action dated Nov. 18, 2016 issued in corresponding Chinese Application No. 201310464531.1, pp. 1-6.
Office Action dated Nov. 21, 2016 issued in corresponding Taiwanese Application No. 102135333, pp. 1-6.

* cited by examiner

THREE-PHASE PERMANENT MAGNET TYPE MOTOR

CROSS-REFERENCE TO RELATED APPLICATION

This application claims priority to Japanese Application No. 2012-219464, filed Oct. 1, 2012, the entirety of which is incorporated herein by reference.

BACKGROUND

1. Technical Field

The invention relates to a three-phase permanent magnet type motor including a multilayer wiring board that connects windings of a motor in which the number of slots is equal to an integer multiple of 12, and the number of poles is equal to an integer multiple of 10 or an integer multiple of 14.

2. Description of Related Arts

In the prior art, a two parallel connection of a three-phase permanent magnet type motor with 10 or 14 poles and 12 slots has been performed using multilayer printed wiring boards of five layers or more. When using the multilayer printed wiring boards of the five layers or more, there has been a problem in that a manufacturing cost increases.

Furthermore, the conventional two parallel connection structure has problems in that an electromagnetic force acting as a factor causing a rotor eccentricity due to imbalance of a winding impedance increases, and a torque ripple acting as a factor causing the speed fluctuation increases.

Therefore, in order to reduce the rotor eccentric force and the speed fluctuation, multilayer printed wiring boards of the series connection have been used.

For example, a three-phase magnet motor with 10 poles and 12 slots has been suggested that is connected via a wiring pattern formed on the multilayer of the multilayer printed wiring board so that current directions of adjacent in-phase windings are facing directions, current directions of adjacent out-of-phase windings are the same direction, and two circuits formed by connecting the adjacent in-phase windings in series are connected in parallel (see Japanese Patent No. 4670868).

However, according to the technique of Japanese Patent No. 4670868, an electric wire diameter of the winding becomes thicker than that of a case of the two parallel connection, a space factor of the winding is lowered, and the motor efficiency is lowered.

As a technique for solving this problem, for example, a winding-connection technique has been suggested in which adjacent in-phase windings are connected in parallel and are connected to a facing symmetrical in-phase winding in series, and a series winding circuit is formed by one line (see, Japanese Patent Application Laid-Open Publication No. 2010-193675).

Incidentally, according to the technique of Japanese Patent Application Laid-Open Publication No. 2010-193675, it is possible to reduce the electromagnetic force that is a factor of the rotor eccentricity, and the torque ripple that is a factor of the speed fluctuation, and it is possible to reduce the multilayer printed wiring board having five layers or more in the prior art to four layers.

However, according to the technique of Japanese Patent Application Laid-Open Publication No. 2010-193675, the workability is likely to worsen, and the manufacturing cost of the multilayer wiring board increases.

The present invention has been devised in view of the above circumstances, and an object thereof is to provide a three-phase permanent magnet type motor that is capable of reducing the electromagnetic force that is a factor of the rotor eccentricity, and the torque ripple which is a factor of the speed fluctuation, reducing the number of layers of the multilayer wiring board forming a connection pattern of the winding, and reducing the manufacturing cost of the multilayer wiring board.

SUMMARY

A three-phase permanent magnet type motor according to the invention for achieving the above object has a stator, a rotor, and a multilayer wiring board.

The stator is configured so that the number of slots on which a plurality of windings wound in the same direction is arranged is set to 12n (n is an arbitrary natural number).

The rotor is configured so that the number of poles of the permanent magnet is set to 10n or 14n.

The multilayer wiring board is connected so as to be a 2m parallel (m is a divisor of n including 1).

There is provided a circuit configuration in which, among au-phase, a V-phase and a W-phase, adjacent in-phase windings are connected in parallel and are connected in series with like-pole windings of a symmetrical in-phase second winding group facing at 6-slot pitch angle, when a center of a first winding group of the adjacent in-phase windings is set to a reference axis.

An in-phase transition wiring pattern is arranged on the same layer of the multilayer wiring board in a line symmetrical manner.

According to the invention, since a circuit configuration is adopted in which among the U-phase, the V-phase and the W-phase, the adjacent in-phase windings are connected in parallel and are connected in series with the like-pole windings of the symmetrical in-phase second winding group facing at 6-slot pitch angle, when the center of the first winding group of the adjacent in-phase windings is set to the reference axis, it is possible to reduce the electromagnetic force that is a factor of the rotor eccentricity, and the torque ripple that is a factor of the speed fluctuation.

Since the in-phase transition wiring pattern is arranged on the same layer of the multilayer wiring board in a line symmetrical manner, it is possible to reduce the number of layers of the multilayer printed wiring board forming the connection pattern of the winding and reduce the manufacturing cost of the multilayer printed wiring board.

DETAILED DESCRIPTION

Hereinafter, a three-phase permanent magnet type motor according to the first to third embodiments of the invention will be described with reference to the drawings.

The three-phase permanent magnet type motor according to the first to third embodiments adopts a circuit configuration in which among a U-phase, a V-phase, and a W-phase, adjacent in-phase windings are connected in parallel and are connected in series to facing symmetrical in-phase windings. Further, an in-phase transition wiring pattern is arranged on the same layer of the multilayer wiring board in a line symmetrical manner. Therefore, the three-phase permanent magnet type motor according to the first to third embodiments is capable of reducing the torque ripple, and reducing the number of layers of the multilayer wiring board, thereby achieving the reduction in manufacturing cost of the multilayer wiring board.

First Embodiment

<Configuration of Three-Phase Permanent Magnet Type Motor>

Figure 1:
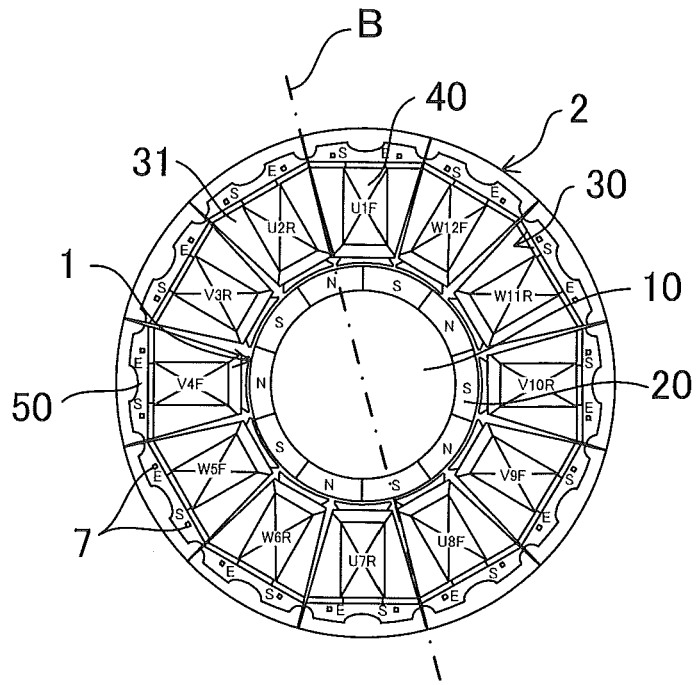
FIG. 1 is a schematic cross-sectional view of a three-phase permanent magnet type motor of a first embodiment.

First, a configuration of the three-phase permanent magnet type motor of the first embodiment will be described with reference to FIG. 1. FIG. 1 is a schematic cross-sectional view of a three-phase permanent magnet type motor according to the first embodiment.

As illustrated in FIG. 1, for example, a three-phase permanent magnet type motor 100 of the first embodiment is configured as an SPM motor (Surface Permanent Magnet Motor) with 10 poles and 12 slots.

The three-phase permanent magnet type motor 100 of the present embodiment includes a rotor 1, a stator 2, and multilayer wiring boards 3 to 6.

The rotor 1 has a rotor core 10 and a permanent magnet 20.

The rotor core 10 is a cylindrical metallic member. As structural materials of the rotor core 10, for example, soft magnetic materials such as silicon steel plate are used, but the materials are not limited to the exemplary material.

The rotor 1 of the SPM motor is configured so that a ring-shaped permanent magnet (a radial anisotropic ring magnet) 20 formed by alternately magnetizing ten poles of N poles and S poles at equal intervals is arranged on an outer circumferential portion surface of a rotor core (or a rotary shaft) 10.

The rotor 1 is not limited thereto, and may have a plurality of permanent magnets (so-called eccentric-shaped magnets) having a shape in which a center of an inner diameter is different from that of an outer diameter, on an outer circumferential portion surface of the rotor core (or the rotary shaft) having a circular cross-sectional shape.

Furthermore, the rotor 1 may include a plurality of permanent magnets (so-called arch-shaped magnets) of a shape having an arched outside and a flat inside, on an outer circumferential portion surface of the rotor core (or the rotary shaft) having a polygonal cross-sectional shape.

As the permanent magnet 20, for example, rare earth magnets such as a neodymium magnet are adopted, but not limited to the exemplary material.

The number of poles of the permanent magnet is not limited to 10 poles, and the number of poles may be 10n or 14n (n is an arbitrary natural number).

The stator 2 has stator cores 30 and windings 40.

The stator core 30 of the present embodiment includes twelve division cores 31, but the number of division cores 11 is not limited. That is, the number of slots of the windings 40 of the present embodiment is 12-slot, but not limited to 12-slot, and the number of the slots may be 12n (n is an arbitrary natural number).

The division core 31 exhibits a generally fan-shaped cross-section, and is assembled in a ring shape by causing the combination surfaces to abut one another. An insulating member 50 is mounted onto the outer circumferential portion of each division core 11.

As a constitution material of the stator core 30, for example, soft magnetic materials such as a silicon steel plate are used similarly to the rotor core 10, but the material is not limited to the exemplary materials.

The winding 40 is wound around each division core 31 in the same direction. A winding start S and a winding end E of the winding 40 in each division core 31 are soldered to a pair of terminals 7, respectively. The pair of terminals 7 is disposed on the insulating member 50. For example, a coated wire such as an enamel wire is adopted as the winding 40.

Next, in FIG. 1, reference numerals added on the winding 40 will be described. A positional relation between a circuit connection diagram described below and the multilayer wiring board becomes clear, by the reference numerals of each winding 40. First, the distinctions of the three phases of U, V or W are added with respect to each of the windings 40 of twelve division cores 31. In addition, the winding numbers are added by the sequential number from No. 1 to No. 12 in a counterclockwise direction. In addition, the differences between the directions of the phase current are discriminated by adding a reference numeral F or a reference numeral R after the number of winding.

For example, U1F and U8F represent the like-poles, and U2R and U7R represent that they are excited so as to be unlike-poles with respect to U1F and U8F. Further, V4F and V9F represent the like-poles, and V3R and V10R represent that they are excited so as to be unlike-poles with respect to V4F and V9F. In addition, W5F and W12F represent the like-poles, and W6R and W11R represent that they are excited so as to be unlike-poles with respect to W5F and W12F.

Figure 2:
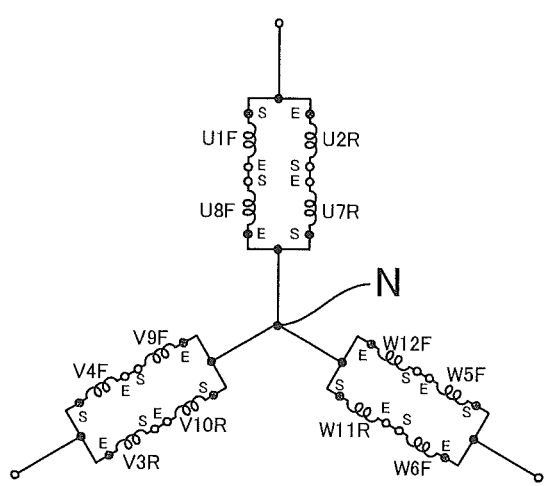
FIG. 2 is a diagram for describing a three-phase Y connection in a stator of the first embodiment.

Next, a three-phase Y connection of the present embodiment will be described with reference to FIG. 2. FIG. 2 is a diagram for describing the three-phase Y connection of the stator of the first embodiment.

As illustrated in FIG. 2, the connection circuit of the present embodiment is configured so that a winding group of one-phase of a circuit configuration, in which adjacent in-phase windings are connected in parallel and are connected in series to facing symmetrical in-phase windings, is set to a three-phase Y connection. Here, the facing symmetrical in-phase windings will be described. A slot pitch $\tau_s[°]$ of the stator 2 of the present embodiment is 360/12n. Furthermore, the number p of pole pairs of the present embodiment is 10n/2 or 14n/2.

As illustrated in FIG. 1, the center of the in-phase winding group is considered as a reference axis B. In this case, when the number p of the pole pairs is used, the facing symmetrical in-phase windings can be generalized to the winding groups that face at an electrical angle $\tau_s \times 6 \times p[°]$. When this is considered at a mechanical angle, both of 10n pole and 14n pole become the symmetrical winding groups that face at $\tau_s \times 6$, that is, at 6-slot pitch angle. Therefore, the facing symmetrical in-phase windings refer to like-pole windings of symmetrical in-phase second winding groups that face at the 6-slot pitch angle, when a center of the first winding group of the adjacent in-phase windings is set to the reference axis B.

That is, in the present embodiment, the entire U-phase windings are formed by connecting in parallel the series circuits of the facing U-phase windings U1F and U8F and the series circuits of the facing U-phase windings U2R and U7R. Further, the entire V-phase windings are formed by connecting in parallel the series circuits of the facing V-phase windings V4F and V9F and the series circuits of the facing V-phase windings V3R and V10R. Furthermore, the entire W-phase windings are formed by connecting in parallel the series circuits of the facing W-phase windings W5F and W12F and the series circuits of the facing W-phase windings W6R and W11R.

Moreover, the entire U-phase windings, the entire V-phase windings, and the entire W-phase windings are set to the three-phase Y connection. By the three-phase Y connection, it is possible to obtain a high output by winding the winding having a thin wire diameter. In addition, S is added to the winding start of each winding, and E is added to the winding end thereof. Furthermore, N is added to the neutral point of the three-phase Y connection.

Next, the multilayer wiring board for performing the three-phase Y connection will be described with reference to FIGS. 3 to 6.

Figure 3:
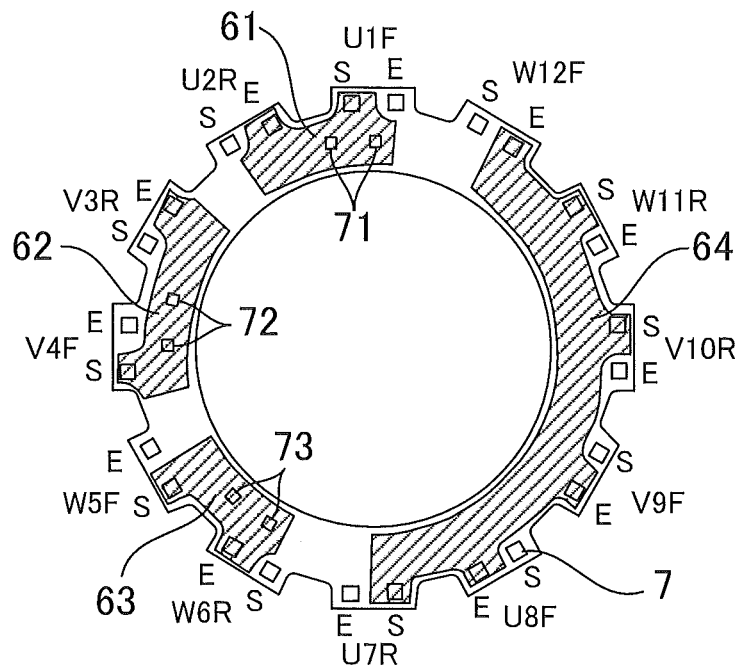
FIG. 3 is a diagram for describing a pattern of a first layer in a multilayer wiring board of the first embodiment.
Figure 4:
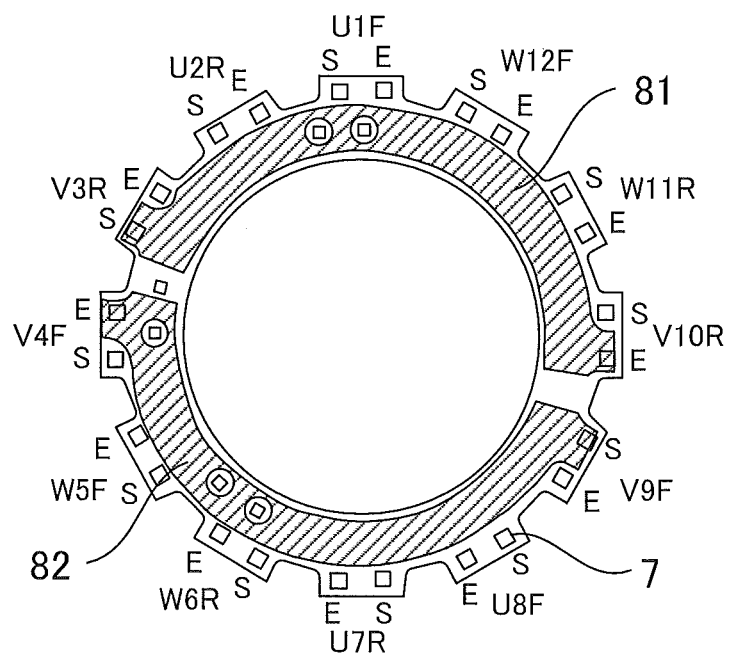
FIG. 4 is a diagram for describing a pattern of a second layer in the multilayer wiring board of the first embodiment.
Figure 5:
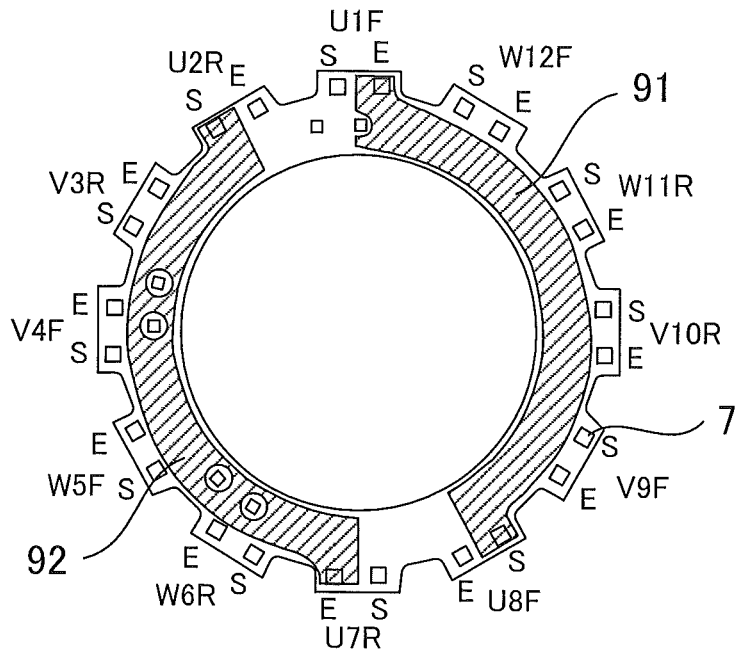
FIG. 5 is a diagram for describing a pattern of a third layer in the multilayer wiring board of the first embodiment.
Figure 6:
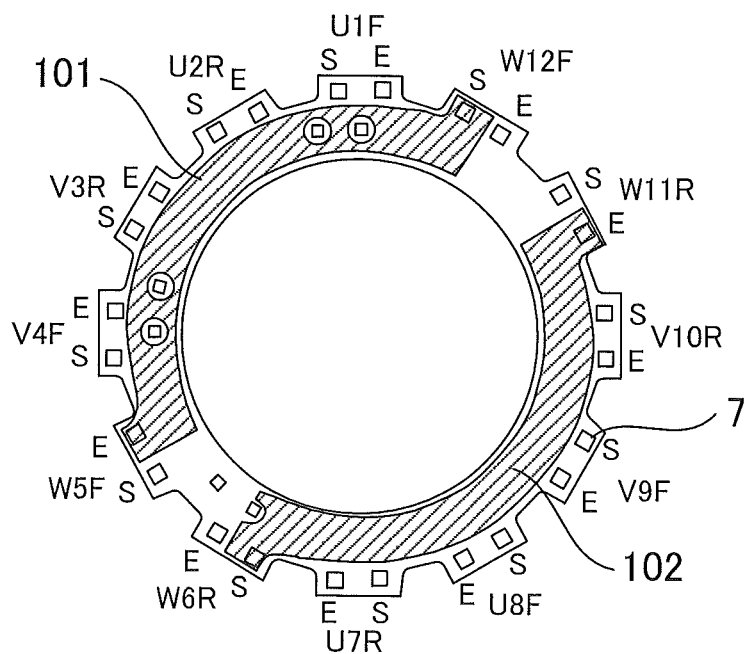
FIG. 6 is a diagram for describing a pattern of a fourth layer in the multilayer wiring board of the first embodiment.

A pattern to be branched in parallel from each phase terminal and a neutral point connection pattern are arranged on the multilayer wiring board 3 of the first layer illustrated in FIG. 3. The in-phase transition wiring patterns are arranged on the multilayer wiring boards 4, 5, and 6 of the second to fourth layers as illustrated in FIGS. 4 to 6 in a line symmetrical manner. It is possible to form a four-layer board by each pattern of the multilayer wiring boards 3 to 6. The multilayer wiring boards 4 to 6 are connected such that 2m parallel (m is a divisor of n including 1) is provided.

FIG. 3 is a diagram for describing the pattern of the first layer in the multilayer wiring board of the first embodiment. In addition, FIG. 3 illustrates each winding number, and the winding start S and the winding end E of each winding.

As illustrated in FIG. 3, patterns 61, 62 and 63 for being branched in parallel from each phase terminal, and a neutral point connection pattern 64 are laid out on the multilayer wiring board 3 of the first layer. Twenty-four terminals 7 illustrated in FIG. 1 penetrate through the vicinity of the outer circumference of each of the first to fourth layers of the multilayer wiring board.

The parallel branch pattern 61 is a pattern that is branched in parallel from a U-phase terminal 71. The parallel branch pattern 61 connects the winding start S of the winding U1F and the winding end E of the winding U2R to the U-phase terminal 71.

The parallel branch pattern 62 is a pattern that is branched in parallel from a V-phase terminal 72. The parallel branch pattern 62 connects the winding end E of the winding V3R and the winding start S of the winding V4F to the V-phase terminal 72.

The parallel branch pattern 63 is a pattern that is branched in parallel from a W-phase terminal 73. The parallel branch pattern 63 connects the winding start S of the winding W5F and the winding end E of the winding W6R to the W-phase terminal 73.

The neutral point connection pattern 64 is connected to each of the winding start S of the winding U7R, the winding end E of the winding U8F, the winding end E of the winding V9F, the winding start S of the winding V10R, the winding start S of the winding W11R, and the winding end E of the winding W12F. The neutral point N of the three-phase Y connection illustrated in FIG. 2 is connected by the neutral point connection pattern 64.

FIG. 4 is a diagram for describing the pattern of the second layer in the multilayer wiring board of the first embodiment. FIG. 4 illustrates each winding number, and the winding start S and the winding end E of each winding.

As illustrated in FIG. 4, wiring patterns 81 and 82 of V-phase are laid out on the multilayer wiring board 4 of the second layer. In the multilayer wiring board 4 of the second layer, the terminal 7, and the winding start S or the winding end E of each winding are electrically connected via the lands, respectively.

The winding start S of the winding V3R and the winding end E of the winding V10R are connected to each other by the wiring pattern 81. Furthermore, the winding end E of the winding V4F and the winding start S of the winding V9F are connected to each other by the wiring pattern 82.

FIG. 5 is a diagram for describing the pattern of the third layer in the multilayer wiring board of first embodiment. In addition, FIG. 5 illustrates each winding number, and the winding start S and the winding end E of each winding.

As illustrated in FIG. 5, wiring patterns 91 and 92 of U-phase are laid out on the multilayer wiring board 5 of the third layer. In the multilayer wiring board 5 of the third layer, the terminal 7, and the winding start S or the winding end E of each winding are electrically connected via the lands, respectively.

The winding end E of the winding U1F and the winding start S of the winding U8F are connected by the wiring pattern 91. Further, the winding start S of the winding U2R and the winding end E of the winding U7R are connected by the wiring pattern 92.

FIG. 6 is a diagram for describing the pattern of the fourth layer in the multilayer wiring board of the first embodiment. In addition, FIG. 6 illustrates each winding number, and the winding start S and the winding end E of each winding.

As illustrated in FIG. 6, wiring patterns 101 and 102 of W-phase are laid out on the multilayer wiring board 6 of the fourth layer. In the multilayer wiring board 6 of the fourth layer, the terminal 7, and the winding start S or the winding end E of each winding are electrically connected via the lands, respectively.

The winding end E of the winding W5F and the winding start S of the winding W12F are connected by the wiring pattern 101. Furthermore, the winding start S of the winding W6R and the winding end E of the winding W11R are connected to each other by the wiring pattern 102.

A printed board formed by a photolithography technique or the like is adopted as the multilayer wiring board, but not limited thereto, and, for example, the wiring pattern may be formed by punching out a copper plate by a press.

<Operation of Three-Phase Permanent Magnet Type Motor>

Next, the operation of the three-phase permanent magnet type motor 100 according to the first embodiment will be described with reference to FIGS. 1 to 6.

As illustrated in FIG. 1, in the rotor 1 of the three-phase permanent magnet type motor 100 of the present embodiment, the permanent magnet 20 with 10 poles evenly magnetized along the circumferential direction is arranged on the outer circumferential surface of the rotor core 10. Meanwhile, the stator 2 is provided so as to surround the rotor 1, and has the winding 40 that is wound in the same direction around a plurality of division cores 31 radially arranged in the circumferential direction.

That is, in the three-phase permanent magnet type motor 100 of the present embodiment, the current flows through the windings 40 of the stator 2 so as to intersect with the magnetic flux generated by the permanent magnet 20 of the rotor 1. When the magnetic flux of the permanent magnet 20 intersects with the current flowing through the winding 40, in the three-phase permanent magnet type motor 100 of the present embodiment, the circumferential driving force is generated by the electromagnetic induction action, thereby rotating the rotor 1 around the axis.

The winding directions of the windings 40 wound around the division cores 31 of the present embodiment are all the same direction. Furthermore, the three-layer Y connection of the present embodiment has a circuit configuration in which the adjacent in-phase windings are connected in parallel, and are connected in series to the like-pole windings of the symmetrical in-phase second winding groups facing at 6-slot pitch angle, when the center of the first winding group of the adjacent in-phase windings is set to the reference axis B. In the multilayer wiring boards 4, 5, and 6 of the second to fourth layers, it is possible to reduce the number of layers of the multilayer wiring board that has been five layers or more in the prior art to four layers, by placing the in-phase transition connection patterns on the same layer in a line symmetrical manner.

The three-phase permanent magnet type motor 100 according to the present embodiment is capable of reducing the electromagnetic force that is a factor of the rotor eccentricity and the torque ripple that is a factor of the speed fluctuation, by connecting the adjacent in-phase windings in parallel and connecting the adjacent in-phase windings in series with the facing symmetrical in-phase windings. Furthermore, it is possible to improve the workability by setting all the winding directions of the windings 40 in the same direction.

Furthermore, the three-phase permanent magnet type motor 100 according to the present embodiment is capable of designing a short insulation distance between the wiring patterns, by placing the in-phase transition wiring patterns on the same layer in the multilayer wiring boards 4, 5, and 6 of the second to fourth layers. Furthermore, by placing the wiring patterns 81 and 82, 91 and 92, and 101 and 102 in a line symmetrical manner, the number of layers can be reduced to four layers. Furthermore, since it is possible to eliminate the useless space and widen the wiring pattern width, it is possible to increase the allowable current.

That is, the three-phase permanent magnet type motor 100 according to the present embodiment is capable of reducing the electromagnetic force that is a factor of the rotor eccentricity and the torque ripple that is a factor of the speed fluctuation, and reducing the number of layers of the multilayer wiring board that forms the connection pattern of the windings, thereby reducing the manufacturing cost of the multilayer wiring board.

Second Embodiment

Figure 7:
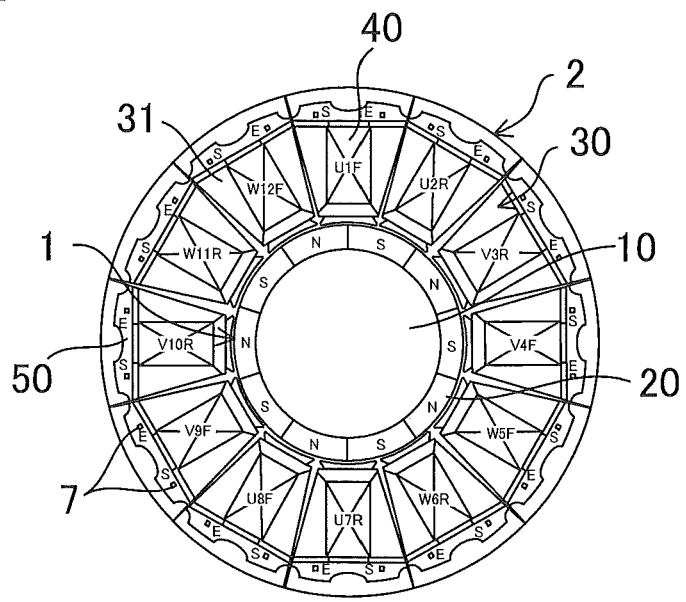
FIG. 7 is a schematic cross-sectional view of a three-phase permanent magnet type motor according to a second embodiment.

Next, a configuration of a three-phase permanent magnet type motor of a second embodiment will be described with reference to FIG. 7. FIG. 7 is a schematic cross-sectional view of the three-phase permanent magnet type motor according to the second embodiment. In addition, the same structural members as those of the first embodiment will be described while being denoted by the same reference numerals.

A three-phase permanent magnet type motor 200 according to the second embodiment is different from that of the first embodiment in the arrangement of the division core 31, the arrangement of the windings of three-phase Y connection, and the structures of the multilayer wiring boards 203 to 206.

In FIG. 7, reference numerals added on the winding 40 will be described. A positional relation between a circuit connection diagram described below and the multilayer wiring board becomes clear, by the reference numerals of each winding 40. First, the distinctions of the three phases of U, V or W are added with respect to each of the windings 40 of the twelve division cores 31. In the present embodiment, the winding numbers are added by the sequential number from No. 1 to No. 12 in the clockwise direction. In addition, the differences between the directions of the phase current are discriminated by adding a reference numeral F or a reference numeral R after the winding numbers.

For example, U1F and U8F represent the like-poles, and U2R and U7R represent that they are excited so as to be unlike-poles with respect to U1F and U8F. Furthermore, V4F and V9F represent the like-poles, and V3R and V10R represent that they are excited so as to be unlike-poles with respect to V4F and V9F. In addition, W5F and W12F represent the like-poles, and W6R and W11R represent that they are excited so as to be unlike-poles with respect to W5F and W12F.

Figure 8:
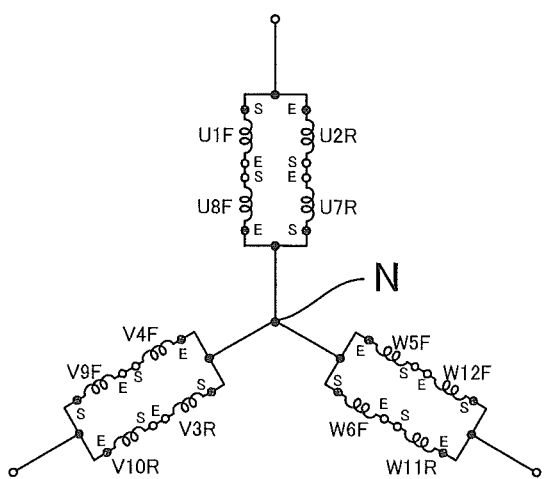
FIG. 8 is a diagram for describing a three-phase Y connection in a stator of the second embodiment.

Next, the three-phase Y connection of the second embodiment will be described with reference to FIG. 8. FIG. 8 is a diagram for describing the three-phase Y connection of the stator of the second embodiment.

As illustrated in FIG. 8, the connection circuit of the present embodiment is configured so that a winding group of one phase of a circuit configuration, in which adjacent in-phase windings are connected in parallel and are connected in series to facing symmetrical in-phase windings, is set to a three-phase Y connection. That is, the entire U-phase windings are formed, by connecting in parallel the series circuits of the facing U-phase windings U1F and U8F and the series circuits of the facing U-phase windings U2R and U7R. Furthermore, the entire V-phase windings are formed, by connecting in parallel the series circuits of the facing V-phase windings V9F and V4F and the series circuits of the facing V-phase windings V10R and V3R. Furthermore, the entire W-phase windings are formed, by connecting in parallel the series circuits of the facing W-phase windings W12F and W5F and the series circuits of the facing W-phase windings W11R and W6R.

Moreover, the entire U-phase windings, the entire V-phase windings, and the entire W-phase windings are set to the three-phase Y connection. By the three-phase Y connection, it is possible to obtain a high output by winding the winding having a thin wire diameter. In addition, S is added to the winding start of each winding, and E is added to the winding end thereof. Furthermore, N is added to a neutral point of the three-phase Y connection.

Next, the multilayer wiring board for performing the three-phase Y connection of the second embodiment will be described with reference to FIGS. 9 to 12.

Figure 9:
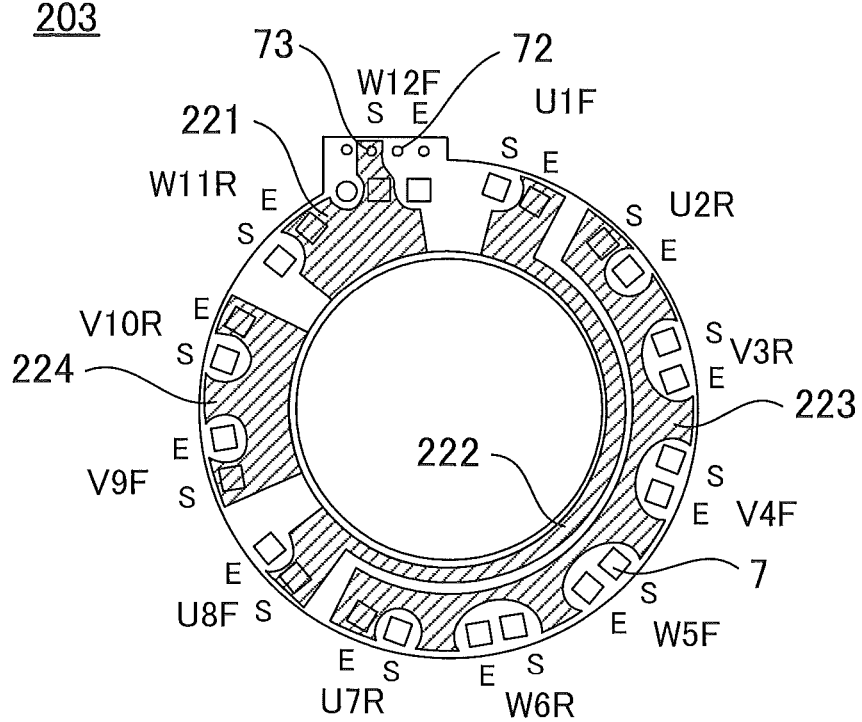
FIG. 9 is a diagram for describing a pattern of a first layer in the multilayer wiring board of the second embodiment.
Figure 10:
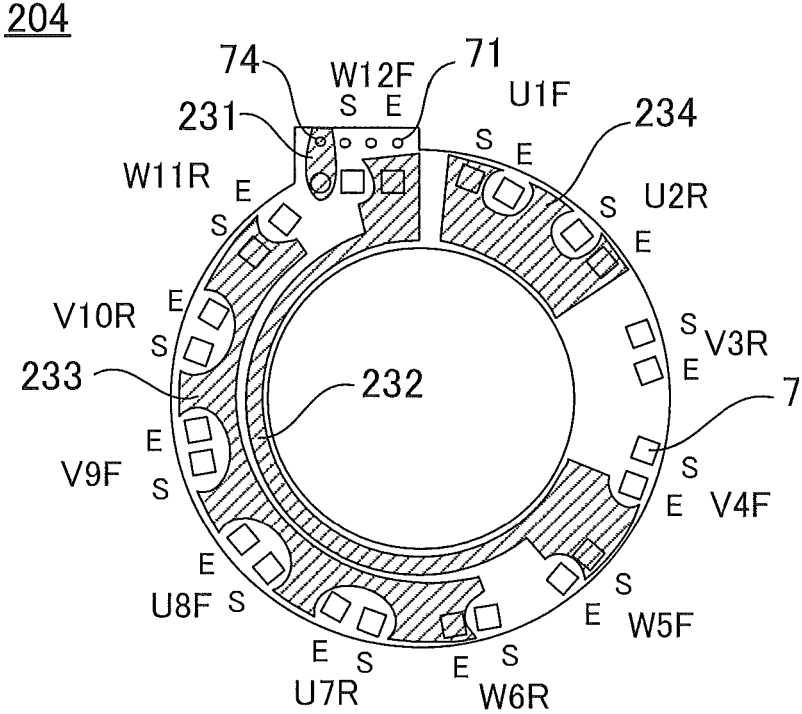
FIG. 10 is a diagram for describing a pattern of a second layer in the multilayer wiring board of the second embodiment.
Figure 11:
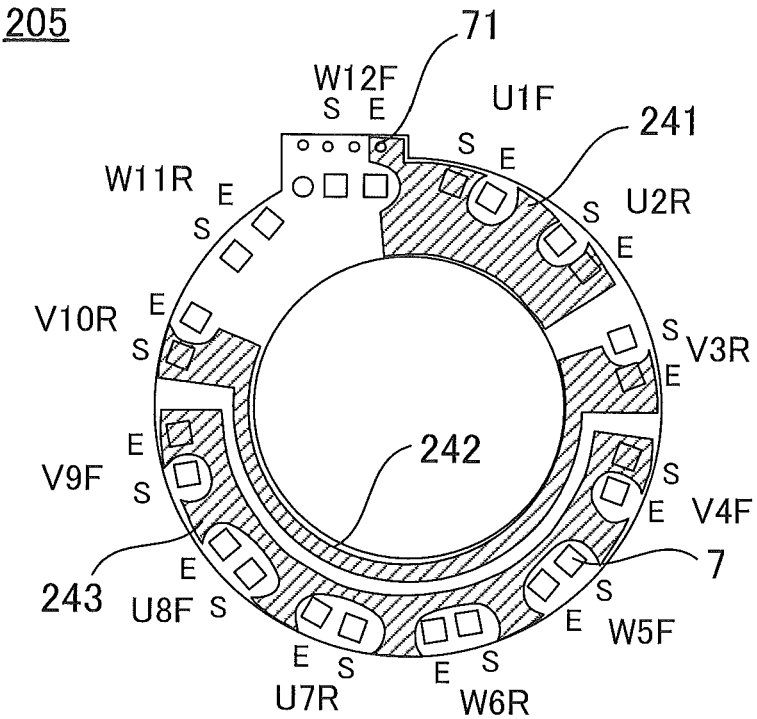
FIG. 11 is a diagram for describing a pattern of a third layer in the multilayer wiring board of the second embodiment.
Figure 12:
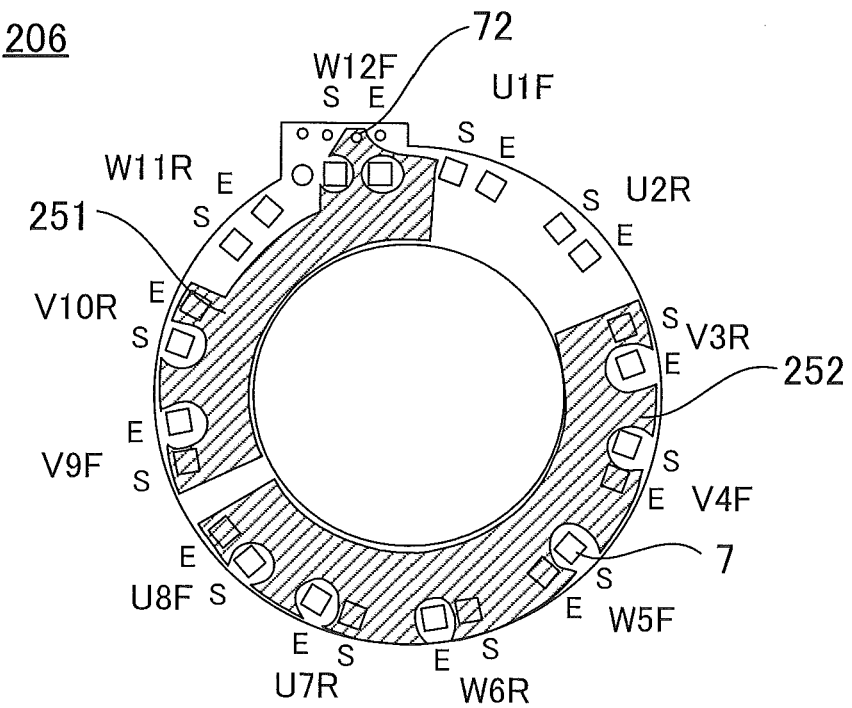
FIG. 12 is a diagram for describing a pattern of a fourth layer in the multilayer wiring board of the second embodiment.

A pattern to be branched in parallel from each phase terminal and the neutral point connection pattern are arranged on a multilayer wiring board 203 of the first layer illustrated in FIG. 9. The in-phase transition wiring patterns are arranged in parallel in a concentric arc shape on the multilayer wiring boards 204, 205, and 206 of the second to fourth layers as illustrated in FIGS. 10 to 12. It is possible to form a four-layer board by each pattern of the multilayer wiring boards 203 to 206.

FIG. 9 is a diagram for describing the pattern of the first layer in the multilayer wiring board of the second embodiment. In addition, FIG. 9 illustrates each winding number, and the winding start S and the winding end E of each winding.

As illustrated in FIG. 9, on the multilayer wiring board 203 of the first layer, a parallel branch pattern 221, and two transition wiring patterns 222 and 223 of the U-phase are laid out in parallel in a concentric arc shape. In the multilayer wiring board 203 of the first layer, the terminal 7, and the winding start S or the winding end E of each winding are electrically connected via the lands, respectively.

The parallel branch pattern 221 is a pattern that is branched in parallel from the W-phase terminal 73. The winding end E of the winding W11R and the winding start S of the winding W12F are connected to the terminal 73 of the W-phase.

The parallel branch pattern 224 is a pattern that is branched in parallel from the V-phase terminal 72. The winding start S of the winding V9F and the winding end E of the winding V10R are connected to the terminal 72 of the V-phase. In addition, it is possible to remove the parallel branch pattern 224 of the V-phase, because it is present in a multilayer wiring board 206 of the fourth layer described below (see FIG. 12).

The winding end E of the winding U1F and the winding start S of the winding U8F are connected by a concentric arc-shaped internal wiring pattern 222. Furthermore, the winding start S of the winding U2R and the winding end E of the winding U7R are connected by a concentric arc-shaped external wiring pattern 223.

FIG. 10 is a diagram for describing the pattern of the second layer in the multilayer wiring board of the second embodiment. In addition, FIG. 10 illustrates each winding number, and the winding start S and the winding end E of each winding.

As illustrated in FIG. 10, on the multilayer wiring board 204 of the second layer, a ground wiring pattern 231 to be connected to a ground terminal 74, and two transition wiring patterns 232 and 233 of the W-phase are laid out in parallel in a concentric arc shape. In the multilayer wiring board 204 of the second layer, the terminal 7, and the winding start S or the winding end E of each winding are electrically connected via the lands, respectively.

The winding start S of the winding W5F and the winding end E of the winding W12F are connected to each other by a concentric arc-shaped internal wiring pattern 232. Furthermore, the winding end E of the winding W6R and the winding start S of the winding W11R are connected to each other by a concentric arc-shaped external wiring pattern 233.

The parallel branch pattern 234 is a pattern that is branched in parallel from the U-phase terminal 71. The winding start S of the winding U1F and the winding end E of the winding U2R are connected to the terminal 71 of the U-phase. In addition, it is possible to remove the parallel branch pattern 234 of the U-phase because it is present in a multilayer wiring board 205 of the third layer described below (see FIG. 11).

FIG. 11 is a diagram for describing the pattern of the third layer in the multilayer wiring board of second embodiment. In addition, FIG. 11 illustrates each winding number, and the winding start S and the winding end E of each winding.

As illustrated in FIG. 11, on the multilayer wiring board 205 of the third layer, a parallel branch pattern 241 and two transition wiring patterns 242 and 243 of the V-phase are laid out in parallel in a concentric arc shape. In the multilayer wiring board 205 of the third layer, the terminal 7, and the winding start S or the winding end E of each winding are electrically connected via the lands, respectively.

The parallel branch pattern 241 is a pattern that is branched in parallel from the U-phase terminal 71. The winding start S of the winding U1F and the winding end E of the winding U2R are connected to terminal 71 of the U-phase.

The winding end E of the winding V3R and the winding start S of the winding V10R are connected to each other by a concentric arc-shaped internal wiring pattern 242. Furthermore, the winding start S of the winding V4F and the winding end E of the winding V9F are connected to each other by the concentric arc-shaped external wiring pattern 243.

As illustrated in FIG. 12, the parallel branch pattern 251 and the neutral point connection pattern 252 are laid out on the multilayer wiring board 206 of the fourth layer. Twenty-four terminals 7 illustrated in FIG. 7 penetrate through the vicinity of the outer circumference of each of the first layer to the fourth layer of the multilayer wiring board.

The parallel branch pattern 251 is a pattern that is branched in parallel from the V-phase terminal 72. The winding start S of the winding V9F and winding end E of the winding V10R are connected to terminal 72 of the V-phase.

The neutral point connection pattern 252 is connected to each of the winding start S of the winding V3R, the winding end E of the winding V4F, the winding end E of the winding W5F, the winding start S of the winding W6R, the winding start S of the winding U7R, and the winding end E of the winding U8F. The neutral point N of the three-phase Y connection illustrated in FIG. 8 is connected by the neutral point connection pattern 252.

The winding directions of the windings 40 wound around the division core 31 of the present embodiment are all the same direction. Furthermore, the three-layer Y connection of the present embodiment has a circuit configuration in which the adjacent in-phase windings are connected in parallel, and are connected in series to the facing symmetrical in-phase windings. In the multilayer wiring boards 203, 204, and 205 of the first to third layers, it is possible to reduce the number of layers of the multilayer wiring board that was five layers or more in the prior art to four layers, by placing the in-phase transition connection patterns on the same layer in a concentric arc shape.

The three-phase permanent magnet type motor 200 according to the present embodiment is capable of reducing the electromagnetic force that is a factor of the rotor eccentricity and the torque ripple that is a factor of the speed fluctuation, by connecting the adjacent in-phase windings in parallel and connecting the adjacent in-phase windings in series with the facing symmetrical in-phase windings. Furthermore, it is possible to improve the workability by setting all the winding directions of the winding 40 in the same direction.

Further, the three-phase permanent magnet type motor 200 according to the present embodiment is capable of designing a short insulation distance between the wiring patterns, by placing the in-phase transition wiring patterns on the same layer in the multilayer wiring boards 203, 204, and 205 of the first to third layers. Furthermore, by placing the concentric arc-shaped wiring patterns 222 and 223, 232 and 233, and 242 and 243 in a line symmetrical manner, the number of layers can be reduced to four layers.

That is, the three-phase permanent magnet type motor 200 according to the second embodiment has basically the same effects as in the first embodiment.

Third Embodiment

Figure 13:
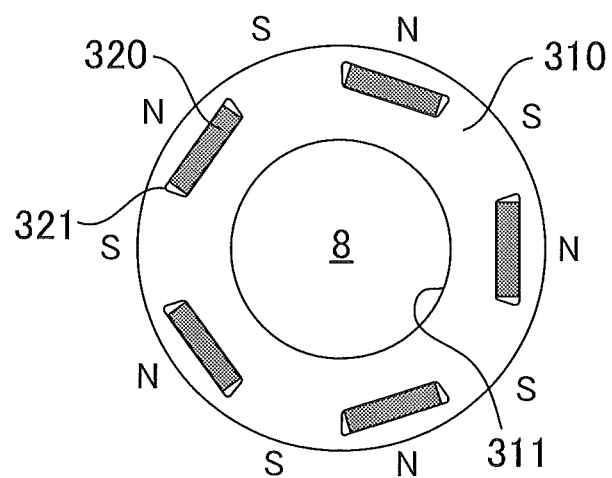
FIG. 13 is a schematic cross-sectional view of a rotor used in a three-phase permanent magnet type motor according to a third embodiment.

Next, a configuration of a three-phase permanent magnet type motor according to a third embodiment will be described with reference to FIG. 13. FIG. 13 is a schematic cross-sectional view of the rotor used in the three-phase permanent magnet type motor according to the third embodiment. In addition, the same structural members as those of the first embodiment will be described while being denoted by the same reference numerals.

A three-phase permanent magnet type motor 300 according to the third embodiment is different from that of the first embodiment in a structure of a rotor 301.

For example, a rotor 301 illustrated in FIG. 13 is configured as a consequent pole type IPM motor (Interior Permanent Magnet Motor) with 10 poles.

The rotor 301 is provided around the rotary shaft 8, and has a rotor core (an iron core) 310, and a permanent magnet 320. The rotary shaft 8 serves as a center of rotation of the rotor 301.

The rotor core 310 is a metallic member having a thick-walled cylindrical shape provided around the rotary shaft 8. For example, the rotor core 310 has a stack structure in which a plurality of ring-shaped rotor core sheets is axially laminated.

In the central portion of each of the rotor cores 310, a circular shaft insertion hole 311 for fitting the rotary shaft 8 thereto is formed. A plurality of magnet housing portions 321 for housing the permanent magnet 320 are formed near the outer circumferential portion of the rotor core 310. The magnet housing portions 321 are disposed uniformly along the circumferential direction.

In the present embodiment, the five magnet housing portions 321 are formed along the circumferential direction. That is, total five permanent magnets 320 are placed so that one permanent magnet 320 is provided in each magnet housing portion 321, respectively. An outer circumferential side of each permanent magnet 320 is magnetized to the N pole. Since the S pole is induced accordingly in the portion of the rotor core 310 between the permanent magnets 320 and 320, the 10-pole rotor is provided.

When the consequent-pole type rotor of this embodiment is combined with the 12-slot stator, the facing in-phase windings are configured so that the impedances are different. For example, when there is provided a rotor position so that the permanent magnets are present in the vicinity of one adjacent two U-phase windings, a rotor core (an iron core) between the permanent magnets is present in the vicinity of the facing diagonal adjacent U-phase windings.

For that reason, since the U-phase winding present in the vicinity of the iron core has higher inductance than the U-phase winding present in the vicinity of the permanent magnet, a large difference is generated in the diagonal winding impedance. Thus, in the case of the consequent-pole type IPM rotor, when combined with the conventional connection method, the current values are different between the parallel circuits, and the torque ripple occurs.

However, as long as the connection structure of the first embodiment is adopted, imbalance of the diagonal impedance is resolved, and the torque ripple can be reduced.

The three-phase permanent magnet type motor according to the third embodiment has basically the same effects as in the first embodiment. In particular, as long as the consequent pole type IPM rotor is adopted as the rotor 301 of the three-phase permanent magnet type motor according to the third embodiment, imbalance of the diagonal impedance can be resolved, and it is possible to have a special effect of reducing the torque ripple.

Although the preferred embodiments of the invention have been described, these are examples for describing the invention, and it is not intended to limit the scope of this invention to only the above embodiments. The invention can be practiced in various aspects different from the above embodiments without departing from the gist of the invention.

What is claimed is:

1. A three-phase permanent magnet type motor having three phases comprising:
   a stator in which a plurality of windings wound in a same direction are disposed, and the number of slots is 12n (n is arbitrary natural number);
   a rotor in which the number of poles of the permanent magnet is 10n or 14n; and
   a multilayer wiring board for providing a connection so as to be 2m parallel (m is divisor of n including 1),
   wherein the three-phase permanent magnet type motor has a circuit configuration in which, among U-phase, V-phase, and W-phase, adjacent in-phase windings are connected in parallel and are connected in series with a like-pole winding of a symmetrical in-phase second winding group facing at 6-slot pitch angle, when a center of a first winding group of the adjacent in-phase windings is set as a reference axis, and
   in-phase transition wiring patterns are disposed on the same layer of the multilayer wiring board in a line symmetrical manner;
   wherein the multilayer wiring board includes first, second and third separate boards each defining a series connection pathways for a corresponding particular motor phase of the three phases, and a fourth board that has (1) at least one parallel electric connection pathway of the motor phases and (2) parallel connection to the neutral point between all motor phases.

2. The three-phase permanent magnet type motor according to claim 1,
   wherein the rotor is a consequent pole type Interior Permanent Magnet ("IPM") rotor.

3. A three-phase permanent magnet type motor having three phases, comprising:
   a stator in which a plurality of windings wound in a same direction are disposed, and the number of slots is 12n (n is arbitrary natural number);
   a rotor in which the number of poles of the permanent magnet is 10n or 14n;
   and a multilayer wiring board for providing a connection so as to be 2m parallel (m is divisor of n including 1),
   wherein the three-phase permanent magnet type motor has a circuit configuration in which, among U-phase, V-phase, and W-phase, adjacent in-phase windings are connected in parallel, and are connected in series with a like-pole winding of a symmetrical in-phase second winding group facing at 6-slot pitch angle, when a center of a first winding group of the adjacent in-phase windings is set as a reference axis, and in-phase transition wiring patterns are disposed on the same layer of the multilayer wiring board in parallel in a concentric arc shape;

wherein the multilayer wiring board includes first, second and third separate boards each defining a series connection pathways for a corresponding particular motor phase of the three phases, and a fourth board that has (1) at least one parallel electric connection pathway of the motor phases and (2) parallel connection to the neutral point between all motor phases.

4. The three-phase permanent magnet type motor according to claim 3, wherein the rotor is a consequent pole type Interior Permanent Magnet ("IPM") rotor.

5. The three-phase permanent magnet type motor according to claim 3:

wherein the first, second and third separate boards each define a parallel connection pathway for one of the three phases of the motor, and a series pathway for a different one of the three phases of the motor, and wherein the fourth board lacks any series connection pathway for the motor phases.

6. A three-phase permanent magnet type motor having three phases comprising:

a stator in which a plurality of windings wound in a same direction are disposed, and the number of slots is 12n (n is arbitrary natural number);

a rotor in which the number of poles of the permanent magnet is 10n or 14n; and a multilayer wiring board for providing a connection so as to be 2m parallel (m is divisor of n including 1), wherein the three-phase permanent magnet type motor has a circuit configuration in which, among U-phase, V-phase, and W-phase, adjacent in-phase windings are connected in parallel and are connected in series with a like-pole winding of a symmetrical in-phase second winding group facing at 6-slot pitch angle, when a center of a first winding group of the adjacent in-phase windings is set as a reference axis, and in-phase transition wiring patterns are disposed on the same layer of the multilayer wiring board in a line symmetrical manner;

wherein the multilayer wiring board includes first, second and third separate boards each defining a series connection pathways for a corresponding particular motor phase of the three phases, and a fourth board that defines parallel connection pathways and parallel connection to the neutral point between all motor phases;

wherein the first, second and third separate boards lack any parallel connection pathways for the three phases, and the fourth board lacks any series connection pathway for the phases.

7. A three-phase permanent magnet type motor having three phases, comprising:

a stator in which a plurality of windings wound in a same direction are disposed, and the number of slots is 12n (n is arbitrary natural number);

a rotor in which the number of poles of the permanent magnet is 10n or 14n;

and a multilayer wiring board for providing a connection so as to be 2m parallel (m is divisor of n including 1), wherein the three-phase permanent magnet type motor has a circuit configuration in which, among U-phase, V-phase, and W-phase, adjacent in-phase windings are connected in parallel, and are connected in series with a like-pole winding of a symmetrical in-phase second winding group facing at 6-slot pitch angle, when a center of a first winding group of the adjacent in-phase windings is set as a reference axis, and in-phase transition wiring patterns are disposed on the same layer of the multilayer wiring board in parallel in a concentric arc shape;

wherein the multilayer wiring board includes first, second and third separate boards each defining a series connection pathways for a corresponding particular motor phase of the three phases, and a fourth board that defines parallel connection pathways and parallel connection to the neutral point between all motor phases;

wherein each of the first, second and third separate boards lacks a combination of a series pathway and a parallel pathway for a same one of the three phases.

* * * * *